(12) United States Patent
Tenkasi Shankar et al.

(10) Patent No.: US 10,957,060 B2
(45) Date of Patent: Mar. 23, 2021

(54) COMPUTING DEVICE AND METHOD OF DETECTING SENSOR OBSTRUCTIONS

(71) Applicant: ZEBRA TECHNOLOGIES CORPORATION, Lincolnshire, IL (US)

(72) Inventors: Raghavendra Tenkasi Shankar, Holbrook, NY (US); David S. Koch, East Islip, NY (US); Zhijia Yuan, Pittsburgh, PA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 180 days.

(21) Appl. No.: 16/359,727

(22) Filed: Mar. 20, 2019

(65) Prior Publication Data
US 2020/0302624 A1 Sep. 24, 2020

(51) Int. Cl.
*G01M 17/02* (2006.01)
*G01B 11/22* (2006.01)
(Continued)

(52) U.S. Cl.
CPC .............. *G06T 7/521* (2017.01); *G01B 11/22* (2013.01); *G01B 21/18* (2013.01); *G01M 17/027* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061;
(Continued)

(56) References Cited

U.S. PATENT DOCUMENTS 6,789,416 B1 * 9/2004 Tracy ..................... G01B 11/22
73/146
10,816,327 B2 * 10/2020 Yuan .................... G01B 11/245
(Continued)

*Primary Examiner* — Andre J Allen

(57) ABSTRACT

A method of detecting sensor obstructions in a computing device includes: at an emitter, emitting a beam of light through a scan window toward a treaded surface; at an image sensor, for a sequence of positions of the computing device along the treaded surface: capturing a sequence of images corresponding to the sequence of positions, each image in the sequence having a first region and a second region; wherein the first regions depict a first subset of reflections of the beam of light originating from a first depth range; and wherein the second regions depict a second subset of the reflections originating from a second depth range; at a controller: receiving the sequence of images; determining, based on the second regions, whether an intensity of the second subset of the reflections exceeds a occlusion threshold; and when the determination is affirmative, generating an alert indicating obstruction of the scan window.

20 Claims, 6 Drawing Sheets

(51) Int. Cl.
*G01B 21/18* (2006.01)
*G06T 7/521* (2017.01)

(58) Field of Classification Search
CPC ... B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................. 73/146–146.8
See application file for complete search history.

(56) References Cited

U.S. PATENT DOCUMENTS

| | | | |
|---|---|---|---|
| 2010/0000310 A1* | 1/2010 | Braghiroli | B60C 11/246 73/146 |
| 2010/0180676 A1* | 7/2010 | Braghiroli | G01M 17/027 73/146 |
| 2011/0126617 A1* | 6/2011 | Bengoechea Apezteguia | G01B 9/02027 73/146 |
| 2015/0330773 A1* | 11/2015 | Uffenkamp | G01B 11/25 356/631 |
| 2016/0029006 A1* | 1/2016 | Zoken | G01C 11/02 348/50 |
| 2020/0018591 A1* | 1/2020 | Rose | G01M 17/027 |
| 2020/0062042 A1* | 2/2020 | Pryce | B60C 11/246 |

* cited by examiner

COMPUTING DEVICE AND METHOD OF DETECTING SENSOR OBSTRUCTIONS

BACKGROUND

Tire wear dictates the need for replacement of a tire, and is typically assessed by measuring the depth of tire treads. A worn tire exhibits shallower treads, and may require replacement. Tire tread depth is typically measured manually with a tread depth gauge, but such measurements may be prone to inaccuracies or measurement errors. Imaging-based tread depth mechanisms may suffer from reduced accuracy resulting from contact between the measurement device and the tire.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
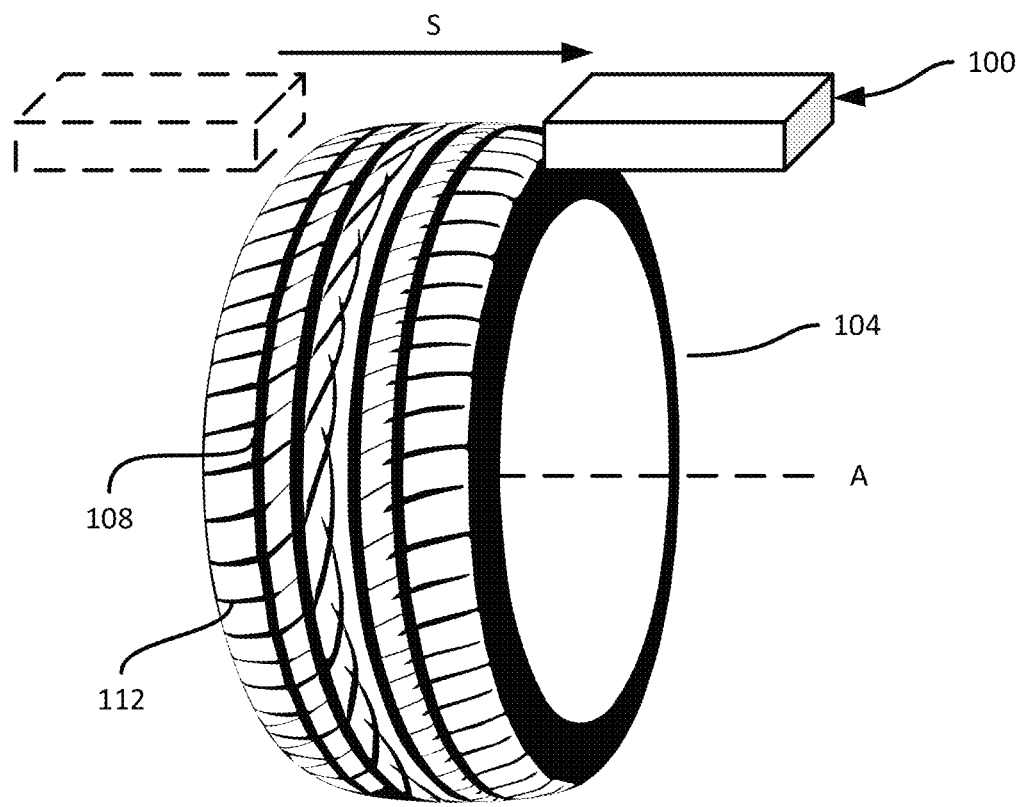
FIG. 1A illustrates a computing device for capturing depth scan data from a tire.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of detecting sensor obstructions in a computing device, the method comprising: at an emitter of the computing device, emitting a beam of light through a scan window toward a treaded surface traversed by the computing device; at an image sensor of the computing device, for a sequence of positions of the computing device along the treaded surface: (i) capturing a sequence of images corresponding to the sequence of positions, each image in the sequence having a first region and a second region; (ii) wherein the first regions depict a first subset of reflections of the beam of light originating from a first depth range; and (iii) wherein the second regions depict a second subset of the reflections originating from a second depth range; at a controller of the computing device: receiving the sequence of images from the image sensor; determining, based on the second regions, whether an intensity of the second subset of the reflections exceeds a occlusion threshold; and when the determination is affirmative, generating an alert indicating obstruction of the scan window.

Additional examples disclosed herein are directed a to computing device, comprising: a scan window; an emitter configured to emit a beam of light through the scan window toward a treaded surface traversed by the computing device; an image sensor configured to, for a sequence of positions of the computing device along the treaded surface: (i) capture a sequence of images corresponding to the sequence of positions, each image in the sequence having a first region and a second region; (ii) wherein the first regions depict a first subset of reflections of the beam of light originating from a first depth range; and (iii) wherein the second regions depict a second subset of the reflections originating from a second depth range; a controller interconnected with the emitter and the image sensor and configured to: receive the sequence of images from the image sensor; determine, based on the second regions, whether an intensity of the second subset of the reflections exceeds an obstruction threshold; and when the determination is affirmative, generate an alert indicating obstruction of the scan window.

Further examples disclosed herein are directed to a non-transitory computer-readable medium storing instructions executable by a controller of a computing device to: control an emitter of the computing device to emit a beam of light through a scan window toward a treaded surface traversed by the computing device; control an image sensor of the computing device to, for a sequence of positions of the computing device along the treaded surface: (i) capture a sequence of images corresponding to the sequence of positions, each image in the sequence having a first region and a second region; (ii) wherein the first regions depict a first subset of reflections of the beam of light originating from a first depth range; and (iii) wherein the second regions depict a second subset of the reflections originating from a second depth range; receive the sequence of images from the image sensor; determine, based on the second regions, whether an intensity of the second subset of the reflections exceeds an obstruction threshold; and when the determination is affirmative, generate an alert indicating obstruction of the scan window.

FIG. 1A depicts a computing device 100 configured to generate depth measurements for an object, such as a tire 104. The tire 104 is shown in isolation but may be mounted on a vehicle, such as an automobile, delivery van, trailer, or the like. In particular, the depth measurements generated by the computing device 100 are depth measurements of a plurality of treads of the tire 104. The depth measurements are also referred to as a tire tread profile, or simply a tread profile, of the tire 104. The treads of the tire 104 may include major treads 108 and minor treads 112. The major treads 108 (of which the tire 104 as illustrated includes four) typically extend continuously around the circumference of the tire 104. Minor treads 112, as seen in FIG. 1A, may not extend continuously around the circumference of the tire 104. The minor treads 112 may also have smaller tread depths than the major treads 108.

In the present example, the computing device 100 is a mobile computing device, such as a mobile computer (e.g. a handheld computer) configured to generate the depth measurements by traversing (e.g. via manipulation by an operator, not shown) the tire 104 or other object to be scanned in a travel direction "S". In the present example, in which the object to be scanned is the tire 104, the travel direction S is parallel to an axis A of the tire (i.e. perpendicular to the major treads 108).

Figure 1B:
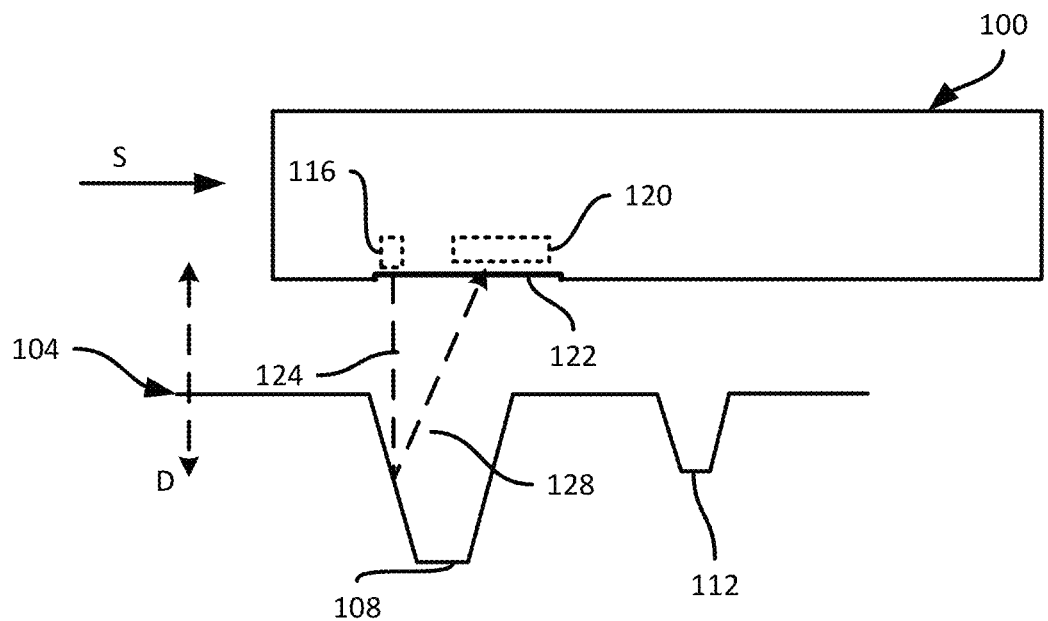
FIG. 1B is a schematic of the computing device of FIG. 1A during capture of the depth scan data.

As seen in FIG. 1B, the computing device 100 includes a light emitter 116 (e.g. a laser emitter such as a laser diode) and an image sensor 120, such as a charge-coupled device (CCD), complementary metal oxide semiconductor (CMOS) or the like, as well as associated optics (e.g. lenses, filters or the like). The emitter 116 and the image sensor 120 are disposed within a housing of the device 100, and the device 100 further includes a transparent scan window 122, also referred to herein simply as the window 122, permitting the exit of light emitted by the emitter 116, and the entry of light reflected from the tire 104 for capture by the image sensor 120.

The device 100, and specifically the emitter 116, emits a beam 124 of light (e.g. a laser beam) via the window 122. A reflection 128 of the beam 124 from the tire 104 returns through the window 122 and is captured by the image sensor 120. The positions of the image sensor 120, the emitter 116 and the window 122 relative to one another are known (e.g. stored as calibration data in the device 100). Based on the above-mentioned positions and the location at which the reflection 128 impacts the image sensor 120 (which is indicative of the angle of the reflection 128 relative to the beam 124), the device 100 can therefore determine a depth D from the image sensor 120 to the point on the tire 104 at which the reflection 128 originated.

As noted above, the window 122 is transparent. However, during use of the device 100, the window 122 may pick up dirt or other debris (for example from the tire 104) that obstructs the window 122, such that the window 122 is no longer entirely transparent. Under such conditions, the window 122 itself may reflect a portion of the emitted beam 124 towards the image sensor 120. The debris on the window 122 may also reduce the intensity of the reflection 128, scatter the reflection 128 (resulting in poor focus of the reflection 128 at the image sensor 120), or both, which in turn may reduce the accuracy of the depth measurements based on the data captured by the image sensor 120.

Figure 2A:
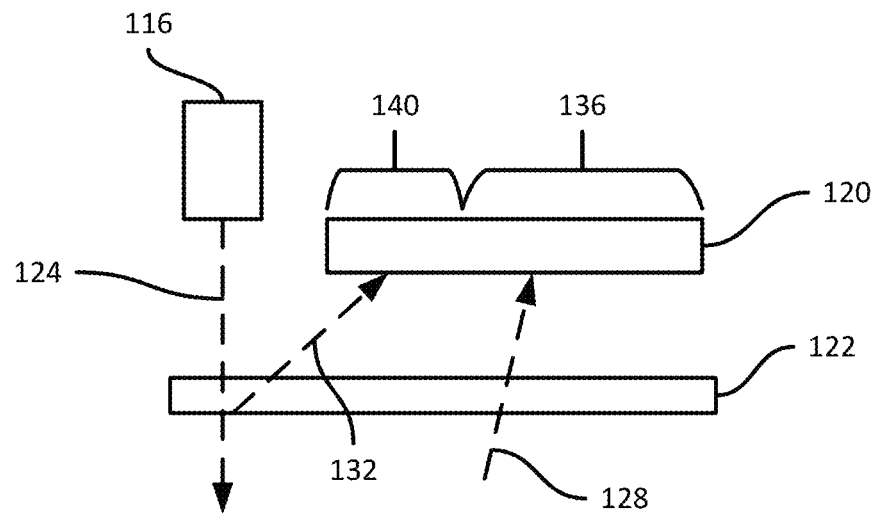
FIG. 2A is a schematic of a portion of the computing device of FIG. 1B.

As illustrated in FIG. 2A, in addition to detecting the reflection 128, the image sensor 120 may therefore also detect a further reflection 132, originating at the window 122 (e.g. scattered by debris on the window 122). In other words, portions of the emitted beam 124 may return towards the image sensor 120 in the form of two distinct subsets of reflections: a first subset originating from the tire 104 (i.e. the reflection 128 shown in FIGS. 1 and 2A), and a second subset originating from the window 122 (i.e. the reflection 132 shown in FIG. 2A). The second subset of reflections is indicative of debris on the window 122, damage to the window 122, or the like, and may negatively affect the depth measurements generated by the device 100. The first subset of reflections, as shown in FIG. 2A, are captured by the image sensor 120 at a first region 136 of the image sensor 120, while the second subset of reflections are captured at a second region 140 of the image sensor 120.

The device 100 therefore implements, as will be discussed in greater detail below, certain functionality to detect the presence and intensity of reflections 132 (indicative of the severity of debris-related occlusions of the window 122), as well as the quality of reflections 128, before generating depth measurements. Before discussing the functionality of the computing device 100 in greater detail, certain components of the computing device 100 will be described with reference to FIG. 2B.

Figure 2B:
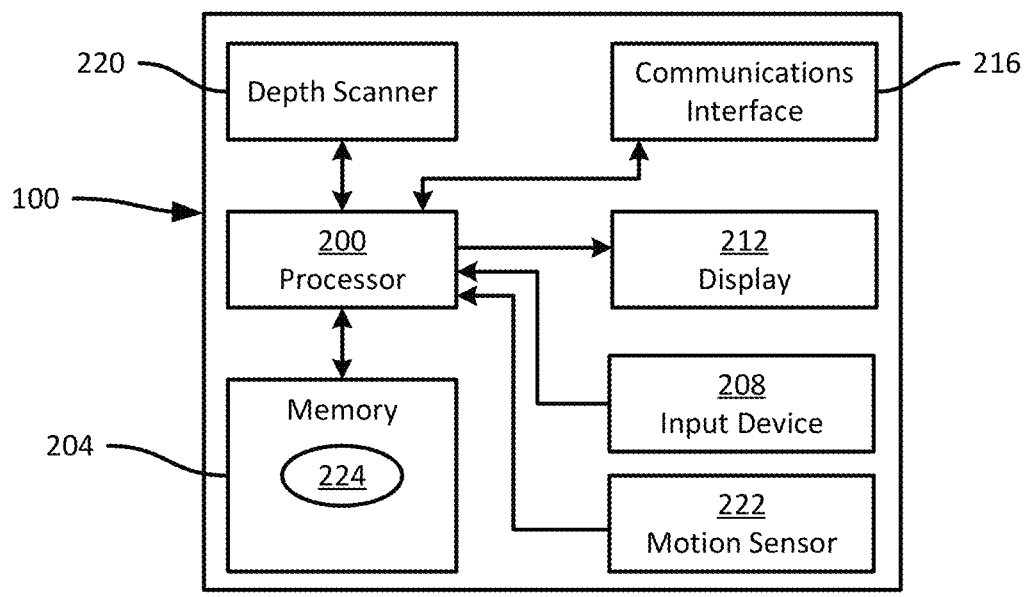
FIG. 2B is a block diagram of certain internal hardware components of the device of FIGS. 1A-1C.

As shown in FIG. 2B, the computing device 100 includes a central processing unit (CPU), also referred to as a processor 200 or a controller, interconnected with a non-transitory computer readable storage medium, such as a memory 204. The memory 204 includes any suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 200 and the memory 204 each comprise one or more integrated circuits.

The computing device 100 also includes at least one input device 208 interconnected with the processor 200. The input device 208 is configured to receive input and provide data representative of the received input to the processor 200. The input device 208 includes any one of, or a suitable combination of, a touch screen, a keypad, a trigger button, a microphone, or the like. The computing device 100 also includes a display 212 (e.g. a flat-panel display integrated with the above-mentioned touch screen) interconnected with the processor 200, and configured to render data under the control of the processor 200. The computing device 100 can also include one or more output devices in addition to the display 212, such as a speaker, a notification LED, and the like (not shown).

The computing device 100 also includes a communications interface 216 interconnected with the processor 200. The communications interface 216 includes any suitable hardware (e.g. transmitters, receivers, network interface controllers and the like) allowing the computing device 100 to communicate with other computing devices via wired and/or wireless links (e.g. over local or wide-area networks). The specific components of the communications interface 216 are selected based on the type(s) of network(s) or other links that the computing device 100 is required to communicate over.

The computing device 100 also includes a depth scanning assembly 220, also referred to as a depth scanner 220, interconnected with the processor 200. The depth scanning assembly 220, in the present example, includes the above-mentioned emitter 116 and image sensor 120. In other examples, the depth scanning assembly 220 can include additional emitters and/or images sensors, or other depth-sensing components instead of the emitter 116 and image sensor 120. The computing device 100 can also include a motion sensor 222, such as an accelerometer, gyroscope, or a combination thereof (e.g. an inertial measurement unit, IMU).

The memory 204 of the computing device 100 stores a plurality of applications, each including a plurality of computer readable instructions executable by the processor 200. The execution of the above-mentioned instructions by the processor 200 causes the computing device 100 to implement certain functionality, as discussed herein. The applications are therefore said to be configured to perform that functionality in the discussion below. In the present example, the memory 204 of the computing device 100 stores an obstruction detection application 224, also referred to herein as the application 224. The computing device 100 is configured, via execution of the application 224 by the processor 200, to capture image data as discussed above, and to assess certain attributes of the captured image data to detect the presence of obstructions (e.g. debris on the window 122) that may negatively affect depth measurements generated from the image data. The device 100 is further configured, based on the outcome of the above-noted assessment, to generate depth measurements or to generate an alert indicating the possible presence of an obstruction on the window 122.

In other examples, the processor 200, as configured by the execution of the application 224, is implemented as one or more specifically-configured hardware elements, such as field-programmable gate arrays (FPGAs) and/or application-specific integrated circuits (ASICs).

Figure 3:
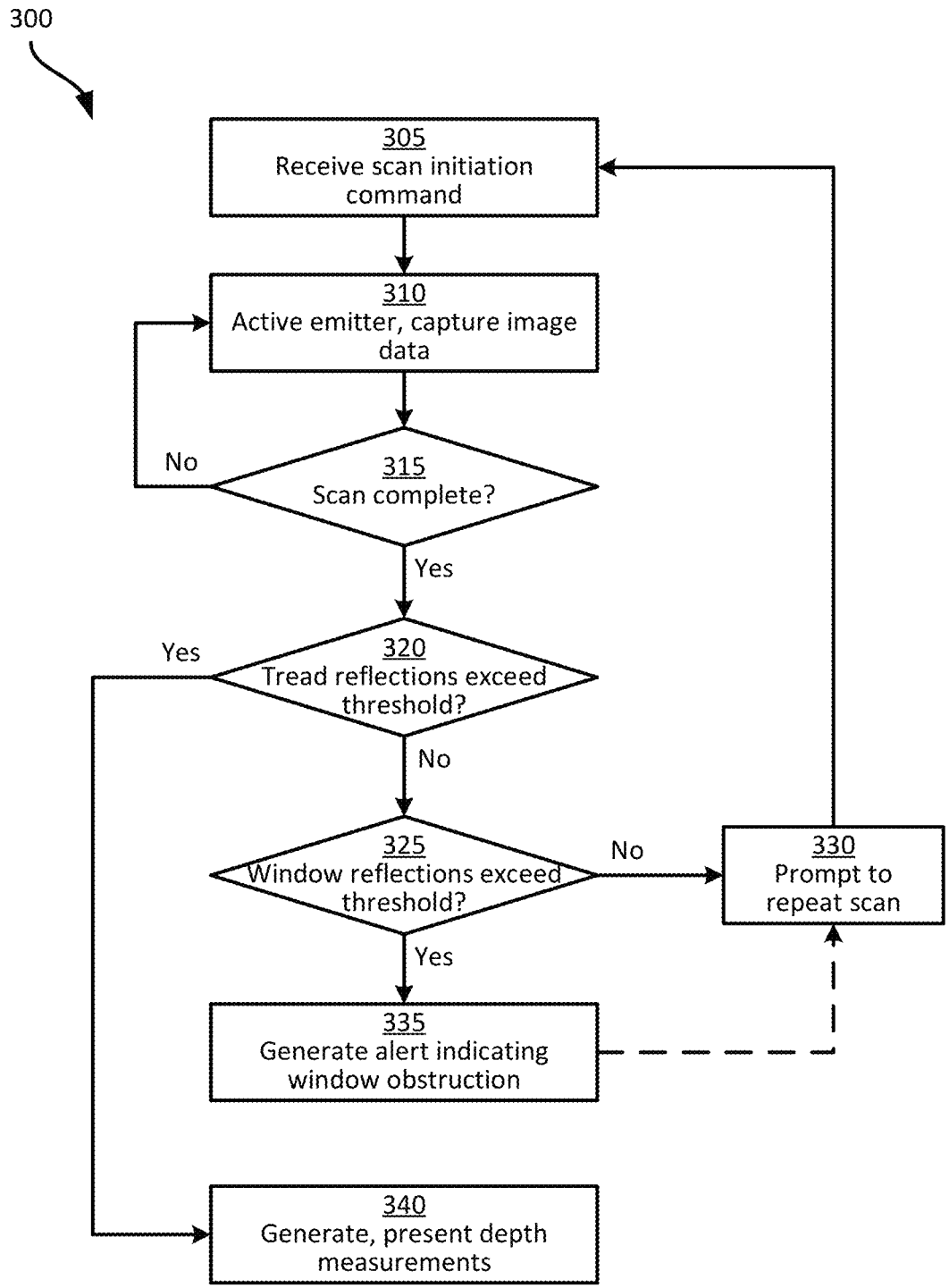
FIG. 3 is a flowchart of a method of detecting sensor obstructions.

The functionality implemented by the computing device 100 via execution of the application 224 will now be described in greater detail, with reference to FIG. 3. FIG. 3 illustrates a method 300 of detecting sensor obstructions. The method 300 will be described in conjunction with its performance by the computing device 100, in particular via the execution of the application 224.

At block 305, the device 100 receives a scan initiation command, to begin emitting light via the emitter 116 and capturing reflections at the image sensor 120. The scan initiation command is received at the processor 200 from the input device 208. The scan initiation command can therefore be a trigger pull, a selection of a command element via a touch screen, activation of a button, or the like. In other examples, the emitter 116 and image sensor 120 operate continuously, and the processor 200 continuously generates depth measurements from the data captured by the image sensor. The processor 200 further determines whether the depth measurements fall within a predefined range indicating that the device 100 has been placed against an object such as the tire 104. An affirmative determination is interpreted by the processor 200 as a scan initiation command. In the discussion below, the scan initiation command is assumed to be an explicit input provided to the processor via the input device 208, and the emitter 116 and image sensor 120 are assumed to be inactive prior to receipt of the initiation command.

At block 310, the processor 200 is configured, responsive to receiving the initiation command, to activate the emitter 116 and begin capturing image data via the image sensor 120. In particular, the image data received at block 310 depicts, at each position along the direction S (as shown in FIG. 1A), any reflections 128 of the beam 124 in a first region of the image sensor 120. The image data further depicts any reflections 132 of the beam 124 in a second region of the image sensor 120. The number of positions captured (i.e. the number of frames of image data captured) varies according to the frame rate of the image sensor 120, which is configurable. A single frame received from the image sensor 120 constitutes one sample from which depth measurements can be generated.

At block 315, the device 100 is configured to determine whether the scan initiated at block 310 is complete. Scan completion can be indicated by the release of an input, such as the above-mentioned trigger, or by a distinct input, such as the selection of a stop command via a touch screen. In some examples, the device 100 can terminate the scan if, for example, the motion sensor 222 indicates movement of the device 100 that deviates from the travel direction S beyond a threshold. For example, if the angular orientation of the device 100 changes (indicating that the device 100 is pitching, yawing and/or rolling during traversal of the tire 104) by more than a predetermined threshold angle, the device 100 may terminate the scan and generate an alert via the display 212 or another suitable output device. In such instances the device 100 may simply end the performance of the method 300.

When the determination at block 315 indicates that the scan is not complete, the performance of block 310 is repeated. In other words, another sample is collected from the image sensor 120. The reflections 128 and/or 132 depicted in each successive frame of image data captured at block 310, as will now be apparent, correspond to successive positions on the tire 104 along the travel direction S. Together, in other words, the image data collected through repeated performances of block 310 depicts a profile of the surface of the tire 104 taken along the travel direction S.

Figure 4:
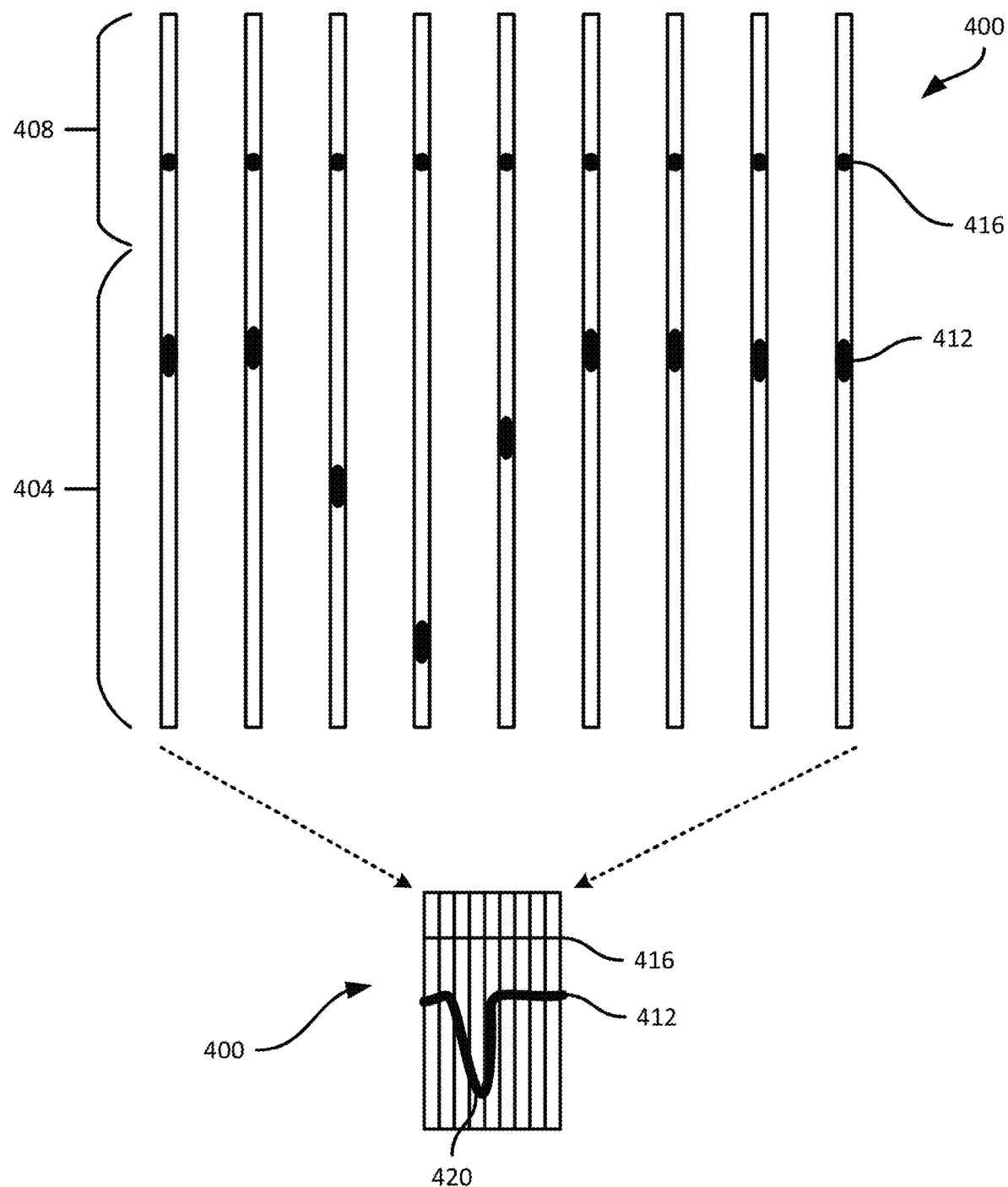
FIG. 4 is a schematic illustrating image data captured during performance of the method of FIG. 3.

Turning to FIG. 4, a set 400 of nine images is illustrated. That is, the set 400 of images depicts the image data collected through nine successive performances of block 310 during a depth scan, and thus each image in the set 400 corresponds to a distinct position of the device 100 on the tire 104 along the travel direction S. Each image in the set 400 includes a first portion 404, corresponding to the first region 136 of the image sensor 120, and a second portion 408, corresponding to the second region 140 of the image sensor 120. The first region 136 of the image sensor, and therefore the first portions 404 of each image in the set 400, depict reflections 128 of the beam 124 from the tire 104. More generally, the first portions 404 depict reflections of the beam 124 from a first depth range encompassing the surface of the tire 104. The second portions 408, on the other hand, depict reflections of the beam 124 from a second depth range encompassing the window 122. The second depth range is smaller than the first depth range, as the window 122 is at a smaller depth relative to the image sensor 120 than the tire 104.

As seen in FIG. 4, each image in the set includes a first representation 412 of a reflection 128 (e.g. a reflection from the tire 104) and a second representation 416 of a reflection 132 (e.g. a reflection from the window 122). Together, as illustrated in the lower portion of FIG. 4, the set 400 of images depict a tire tread profile depicting one tread 420, in addition to an artifact caused by debris on the window 122 (i.e. the collected second representations 416). The position of each representation 412 and 416 on the captured images indicates the depth from which the corresponding reflections 128 and 132 originated.

Returning to FIG. 3, when the determination at block 315 is complete, the device 100 proceeds to block 320. At block 320, prior to generating depth measurements based on the image data captured at block 310, the device 100 determines whether the representations 412 of reflections in the first subset mentioned above exceed a quality threshold. In general, at block 320 the device 100 is configured to determine whether the representations 416 are sufficient to generate depth measurements of a desired accuracy. The threshold applied at block 320 can include an intensity threshold. For example, the device 100 can be configured to determine the mean intensity of the first portion 404 of the collected image data (or the mean intensity of any pixels in the first portion 404 with non-zero intensity values) and to determine whether the mean intensity exceeds a predefined threshold. An intensity below the threshold may indicate that too few samples were collected, or that the samples collected were diffused or otherwise corrupted, whether by debris on the window 122 or other factors.

In other examples, the threshold can include a sample count threshold. That is, the device 100 can be configured to determine, for each frame of image data captured at block 310, whether a representation 412 appears in the image data with an intensity over a minimum threshold, indicating that a reflection was captured. The device 100 can be further configured to determine, for the entire scan, a number of such samples captured. If the number of samples captured falls below a threshold, the determination at block 320 is negative.

Figure 5A:
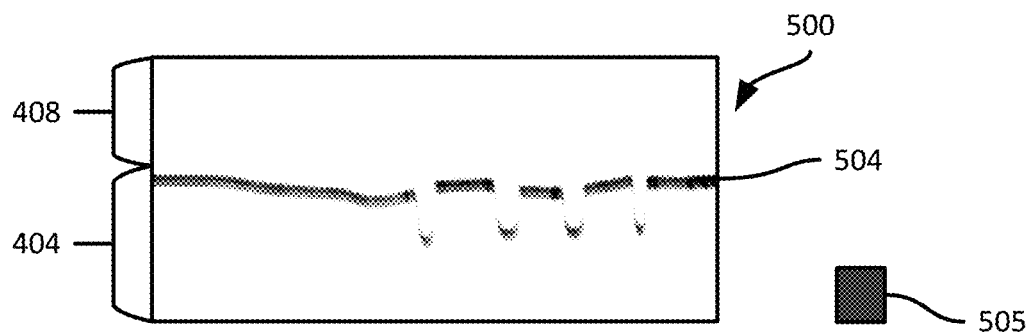
FIGS. 5A-5C are schematics illustrating further examples of image data captured during performance of the method of FIG. 3.
Figure 5B:
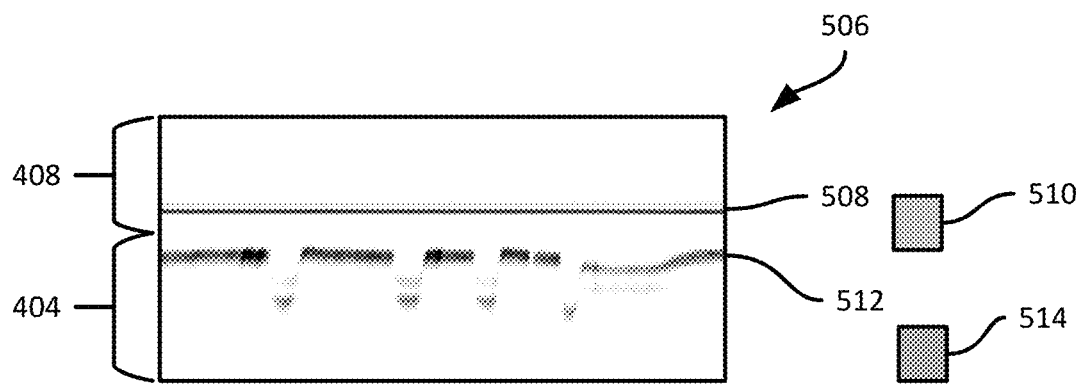
Figure 5C:
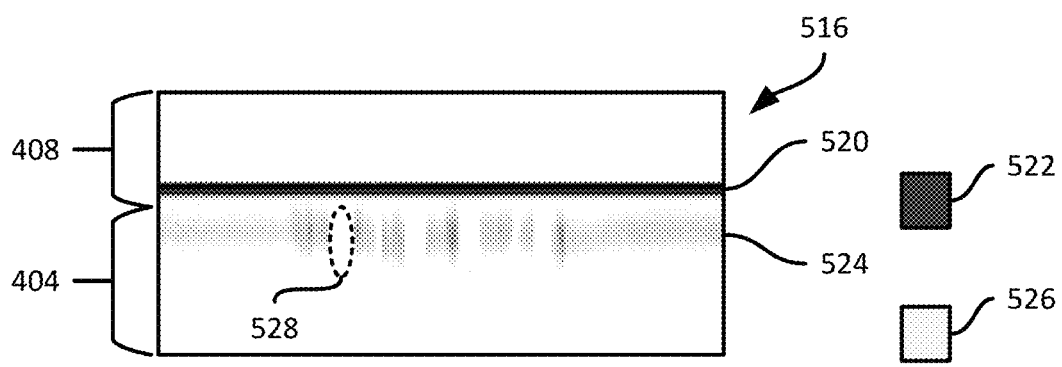

Referring to FIGS. 5A-5C, examples of captured image data (i.e. sets of images captured during a scan) are shown, with varying levels of contamination present on the window 122. FIG. 5A, in particular, illustrates a set 500 of images in which the second portion 408 contains no samples (i.e. no reflections), while the first portion 404 contains a set of representations 504 (i.e. of reflections 128) with a mean intensity above a threshold. FIG. 5A also graphically depicts the mean intensity 505 of the non-zero pixels in the first portion 404.

FIG. 5B illustrates a set 506 of images in which the second portion 408 contains a set of representations 508 indicating the receipt of reflections 132 from the window 122 itself. The representations 508 have a mean intensity 510. FIG. 5B also shows that the first portion 404 contains a set of representations 512 (i.e. of reflections 128) with a mean intensity 514 lower than the intensity of the representations 504 in FIG. 5A. The reduced intensity of the representations 512 may be caused, for example, by the debris causing the capture of the representations 508. The mean intensity of the first portion 404 in the set of images 506 is nevertheless assumed to be above the above-mentioned threshold.

FIG. 5C illustrates a further set 516 of images, in which the second portion 408 contains a set of representations 520 indicating the receipt of reflections 132 from the window 122 itself. The representations 520 have a mean intensity 522 greater than the intensity 510 of the representations 508 of FIG. 5B, indicating stronger reflections 132 and therefore greater obstruction of the window 122. FIG. 5C also shows that the first portion 404 contains a set of representations 524 (i.e. of reflections 128) with a mean intensity 526 lower still than the intensity of the representations 512 in FIG. 5B. In addition, several areas in the image set 516, such as the area 528, include no data (i.e. the portion 404 contains no samples in the area 528). The mean intensity 526 of the first portion 404 in the set 516 is assumed to fall below the quality threshold applied at block 320.

Returning to FIG. 3, when the determination at block 320 is affirmative, as in the case of the sets 500 and 506 shown in FIGS. 5A and 5B, the device 100 proceeds to generate depth measurements, as will be discussed further below. When, on the other hand, the determination at block 320 is negative, as in the case of the set 516 shown in FIG. 5C, the device 100 proceeds to block 325. A negative determination at block 320 indicates that the tire profile signal captured via the image sensor 120 may be of insufficient quality to generate reliable depth measurements. The performance of block 325, as will be discussed below, seeks to determine whether the cause of the insufficient quality is obstruction at the window 122.

At block 325, the device 100 is configured to determine whether the second regions 408 of the captured set of images (e.g. the set 516 shown in FIG. 5C) depict a second subset of reflections that exceed an obstruction threshold. The obstruction threshold, like the quality threshold mentioned above, can be an intensity-based threshold, a sample count-based threshold, or a combination thereof. In other examples, the threshold can be a thickness threshold, which is compared to a thickness of a band of representations in the second portion 408. to Taking the example of FIG. 5C, the device 100 is therefore configured, at block 325, to determine whether the mean intensity 522 of the representations 520 in the second portions 408 of the image set 516 exceeds a mean intensity threshold.

When the determination at block 325 is negative (i.e. when the mean intensity of the representations in the second region 408 does not exceed the obstruction threshold), the device 100 proceeds to block 330. At block 330, the device 100 can prompt the operator to repeat the scan, e.g. by rendering a message on the display 212. The performance of method 300 can then return to block 305. As will be understood by those skilled in the art, an affirmative determination at block 320, followed by a negative determination at block 325, indicates poor tire profile signal quality that cannot be explained by (or at least not entirely explained by) debris on the window 122.

Figure 6:
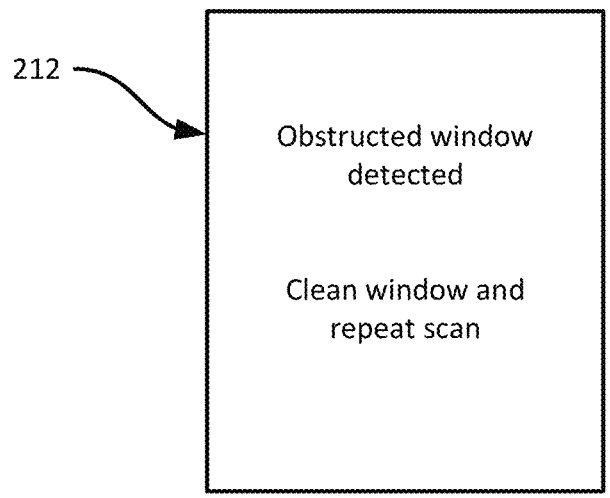
FIG. 6 is a schematic illustrating an alert generating during the performance of the method of FIG. 3.

When the determination at block 325 is affirmative (e.g. as in connection with FIG. 5C) the device 100 is configured to proceed to block 335. At block 335 the device 100 generates an alert indicating that a window obstruction has been detected. The device 100 may also prompt the operator to repeat the scan, either in the same alert generated at block 335, or via a subsequent performance of block 330. FIG. 6A illustrates an example alert generated on the display 212 at block 335.

As mentioned above, responsive to an affirmative determination at block 320, the device 100 is configured to generate depth measurements from the captured data, by proceeding to block 340. That is, the device 100 is configured to generate depth measurements irrespective of the presence of debris on the window 122, as long as the signal quality is sufficient (i.e. meets the threshold at block 320). The device 100 can also, in other embodiments, perform a determination similar to the determination at block 325 after an affirmative determination at block 320, and generate an alert informing the operator of the need to clean the window 122 before generating depth measurements at block 340.

At block 340, the device 100 is configured to determine, for each sample of image data (e.g. for each of the nine images shown in FIG. 4), a depth measurement from the first portion 404. Determination of depth measurements at block 340 can include selecting, for each representation 412, a measurement point. As will now be apparent, the reflections 128 typically impact the image sensor 120 at a plurality of pixel locations, and the representations 412 therefore each include several pixels (forming an elliptical shape in FIG. 4). The device 100 can therefore be configured to select a pixel from each representation 412 with a peak intensity. In other examples, the device 100 can be configured to determine the center of each representation 412, and to determine a depth measurement based on the location of the center on the image sensor 120. Based on the position of the selected point in the image data, and based on the calibration data mentioned above, the device 100 is configured to determine a depth, relative to the image sensor 120, at which the reflection 128 originated. This process is repeated for each representation 412, to generate an array of depth measurements corresponding to respective positions of the device 100 along the travel direction S.

Having generated depth measurements at block 340, the device 100 can also present the depth measurements, e.g. on the display 212, by transmitting the depth measurements via the communications interface 216, or by controlling any other suitable output device (e.g. a printer).

Variations to the above device and method are contemplated. For example, the second region 140 of the image sensor 120 can be subdivided into two subregions, one corresponding to the depth of an exterior surface of the window 122, and the other corresponding to the depth of an interior surface of the window 122. Blocks 325 and 335 can be performed with respect to the subregion corresponding to the exterior surface, to detect debris that can be cleaned from the outside of the window 122. The device 100 can also be configured to perform a distinct instance of block 325 with respect to the first subregion to detect debris or other occlusions on the interior surface of the window 122, which may indicate manufacturing defects or loss of structural integrity of the housing of the device 100. The device 100 can be configured to generate a separate alert responsive to an affirmative determination at the above instance of block 325 (e.g. prompting the operator to send the device 100 for repair or replacement).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting sensor obstructions in a computing device, the method comprising:
at an emitter of the computing device, emitting a beam of light through a scan window toward a treaded surface traversed by the computing device;
at an image sensor of the computing device, for a sequence of positions of the computing device along the treaded surface:
(i) capturing a sequence of images corresponding to the sequence of positions, each image in the sequence having a first region and a second region;
(ii) wherein the first regions depict a first subset of reflections of the beam of light originating from a first depth range; and
(iii) wherein the second regions depict a second subset of the reflections originating from a second depth range;
at a controller of the computing device:
receiving the sequence of images from the image sensor;
determining, based on the second regions, whether an intensity of the second subset of the reflections exceeds an obstruction threshold; and when the determination is affirmative, generating an alert indicating obstruction of the scan window.

2. The method of claim 1, wherein the alert includes a prompt to clean the scan window.

3. The method of claim 1, further comprising, at the controller: when the determination is negative, generating a set of depth measurements corresponding to the treaded surface from the first regions.

4. The method of claim 1, wherein determining whether the intensity of the second subset of the reflections exceeds the obstruction threshold comprises at least one of (i) generating a mean intensity from the second regions, and (ii) generating a sample count from the second regions.

5. The method of claim 1, further comprising, at the controller: prior to determining whether the intensity of the second subset of the reflections exceeds the obstruction threshold, determining based on the first regions that an intensity of the first subset of reflections does not exceed a quality threshold.

6. The method of claim 5, further comprising, at the controller: responsive to determining that the intensity of the second subset of the reflections does not exceed the obstruction threshold, generating a prompt to repeat a data capture.

7. The method of claim 5, wherein determining that the intensity of the first subset of reflections does not exceed the quality threshold includes at least one of (i) generating a mean intensity from the first regions, and (ii) generating a sample count from the first regions.

8. The method of claim 1, wherein the first depth range corresponds to the treaded surface.

9. The method of claim 1, wherein the second depth range corresponds to the scan window.

10. A computing device, comprising:
a scan window;
an emitter configured to emit a beam of light through the scan window toward a treaded surface traversed by the computing device;
an image sensor configured to, for a sequence of positions of the computing device along the treaded surface:
  (i) capture a sequence of images corresponding to the sequence of positions, each image in the sequence having a first region and a second region;
  (ii) wherein the first regions depict a first subset of reflections of the beam of light originating from a first depth range; and
  (iii) wherein the second regions depict a second subset of the reflections originating from a second depth range;
a controller interconnected with the emitter and the image sensor and configured to:
  receive the sequence of images from the image sensor;
  determine, based on the second regions, whether an intensity of the second subset of the reflections exceeds an obstruction threshold; and
  when the determination is affirmative, generate an alert indicating obstruction of the scan window.

11. The computing device of claim 10, wherein the alert includes a prompt to clean the scan window.

12. The computing device of claim 11, further comprising a display; wherein the controller is configured to generate the alert by controlling the display to present the prompt.

13. The computing device of claim 10, wherein the controller is further configured to:
when the determination is negative, generate a set of depth measurements corresponding to the treaded surface from the first regions.

14. The computing device of claim 10, wherein the controller is configured, to determine whether the intensity of the second subset of the reflections exceeds the obstruction threshold, to generate at least one of: (i) a mean intensity from the second regions, and (ii) a sample count from the second regions.

15. The computing device of claim 10, wherein the controller is further configured, prior to the determination of whether the intensity of the second subset of the reflections exceeds the obstruction threshold, to determine based on the first regions that an intensity of the first subset of reflections does not exceed a quality threshold.

16. The computing device of claim 15, wherein the controller is further configured, responsive to a determination that the intensity of the second subset of the reflections does not exceed the obstruction threshold, to generate a prompt to repeat a data capture.

17. The computing device of claim 15, wherein the controller is further configured, to determine that the intensity of the first subset of reflections does not exceed the quality threshold, to generate at least one of: (i) a mean intensity from the first regions, and (ii) a sample count from the first regions.

18. The computing device of claim 10, wherein the first depth range corresponds to the treaded surface.

19. The computing device of claim 10, wherein the second depth range corresponds to the scan window.

20. A non-transitory computer-readable medium storing instructions executable by a controller of a computing device to:
control an emitter of the computing device to emit a beam of light through a scan window toward a treaded surface traversed by the computing device;
control an image sensor of the computing device to, for a sequence of positions of the computing device along the treaded surface:
  (i) capture a sequence of images corresponding to the sequence of positions, each image in the sequence having a first region and a second region;
  (ii) wherein the first regions depict a first subset of reflections of the beam of light originating from a first depth range; and
  (iii) wherein the second regions depict a second subset of the reflections originating from a second depth range;
receive the sequence of images from the image sensor;
determine, based on the second regions, whether an intensity of the second subset of the reflections exceeds an obstruction threshold; and
when the determination is affirmative, generate an alert indicating obstruction of the scan window.

* * * * *